United States Patent [19]

Russell

[11] Patent Number: 4,632,209
[45] Date of Patent: Dec. 30, 1986

[54] ANTI-THEFT DEVICE FOR AUTOMOBILES

[76] Inventor: Theodore C. Russell, 30 Coleman Rd., West Haven, Conn. 06516

[21] Appl. No.: 772,173

[22] Filed: Sep. 3, 1985

[51] Int. Cl.[4] .......................... B60R 25/00; B62H 5/00
[52] U.S. Cl. ...................................... 180/287; 70/199; 70/200; 70/203; 70/205; 70/237
[58] Field of Search .................. 180/287, 289; 70/199, 70/200, 203, 205, 237, 238

[56] References Cited

U.S. PATENT DOCUMENTS

| 1,263,731 | 4/1918 | Baker | 70/200 |
|---|---|---|---|
| 1,448,462 | 3/1923 | Ryan | 70/237 |
| 1,527,992 | 3/1925 | Norton | 70/200 |
| 1,634,583 | 7/1927 | Kissinger | 70/200 |
| 3,690,131 | 9/1972 | Davis | 70/203 |
| 4,076,095 | 2/1978 | Adamski | 180/287 |
| 4,333,326 | 6/1982 | Winters | 70/203 |

FOREIGN PATENT DOCUMENTS

| 1380042 | 1/1975 | United Kingdom | 70/237 |
|---|---|---|---|
| 2023520 | 1/1980 | United Kingdom . | |
| 2119333 | 11/1983 | United Kingdom | 70/237 |

Primary Examiner—John J. Love
Assistant Examiner—Kenneth R. Rice
Attorney, Agent, or Firm—St. Onge Steward Johnston & Reens

[57] ABSTRACT

An anti-theft locking device is described for immobilizing a foot pedal assembly normally necessary for operation of an automobile. A first rigid plate, hingably attached to the floor of the automobile adjacent to the foot pedal assembly, can be moved from a stored position on the floor to an immobilizing position blocking access to the foot pedal assembly. A second rigid plate, hingably attached to one end of the first rigid plate, can be folded under the first one in the stored position but, in operation of the device, serves to brace the first plate in the immobilizing position. The second plate is locked in the brace position by means such as a padlock secured to a hoop on the floor of the automobile projecting through an aperture on said plate.

The device can be installed as original equipment in an automobile or can be retrofitted thereto at any time during the life of the automobile.

11 Claims, 3 Drawing Figures

ANTI-THEFT DEVICE FOR AUTOMOBILES

1. Field Of The Invention

This invention relates to anti-theft devices and is more particularly concerned with an improved anti-theft device for immobilizing the foot pedal assembly of an automobile.

2. Description of the Prior Art

Many different forms of security devices for preventing theft of automobiles have been described. Such devices include door locks, burglar alarms, secondary ignition switches and the like. Devices which lock one or more of the foot pedals of the automobile have also been proposed and have had varying degrees of success. Illustrative of such devices are those described in Kissinger U.S. Pat. No. 1,634,583, Davis, U.S. Pat. No. 3,690,131, Adamski U.S. Pat. No. 4,076,095, Winter U.S. Pat. No. 4,333,326 and Stoodley UK patent application No. 2,023,520 A. A drawback common to all these devices, apart from any consideration of efficacy, is that the components thereof, some of which are bulky, have to be dismantled and stored when not in use and re-assembled each time the device is to be employed.

The device of this invention, which will be described in detail hereinbelow, represents a marked improvement over the foot pedal locking devices hitherto known in that, in addition to being highly effective in immobilizing the pedal assembly, it can be folded away in the floor of the automobile when not in use. The need to dismantle the device and store the components thereof after use is thereby obviated. Further, the device of the invention can be provided as original equipment by the manufacturer of the automobile or can be retrofitted at any stage in the life of the automobile. The advantages presented by such a device will be readily apparent to one skilled in the art.

SUMMARY OF THE INVENTION

It is an object of the invention to provide an improved device for preventing the theft of an automobile by immobilizing the foot pedal assembly.

It is a further object of the invention to provide a device for effectively immobilizing the foot pedal assembly of an automobile which device can be folded for storage on the floor of the automobile when not in use.

It is yet a further object of the invention to provide a device for effectively immobilizing the foot pedal assembly of an automobile which device is free from bulky components which have to be disassembled and stored when not in use.

These objects, and other objects which will become apparent from the description which follows, are met by the device of the invention. The latter, in its broadest aspect, comprises a first rigid plate hingably attached to the floor of the automobile adjacent the foot pedal assembly and adapted to be moved from a stored position on said floor to an immobilizing position in contact with said foot pedal assembly. A second rigid plate is hingably attached to said first rigid plate and is adapted to be folded under said first rigid plate in the stored position and to brace said first rigid plate securely against said pedal assembly when said first rigid plate is in the immobilizing position. Locking means serves to secure said second rigid plate in the brace position when the device is in operation.

DETAILED DESCRIPTION OF THE INVENTION

Figure 1:
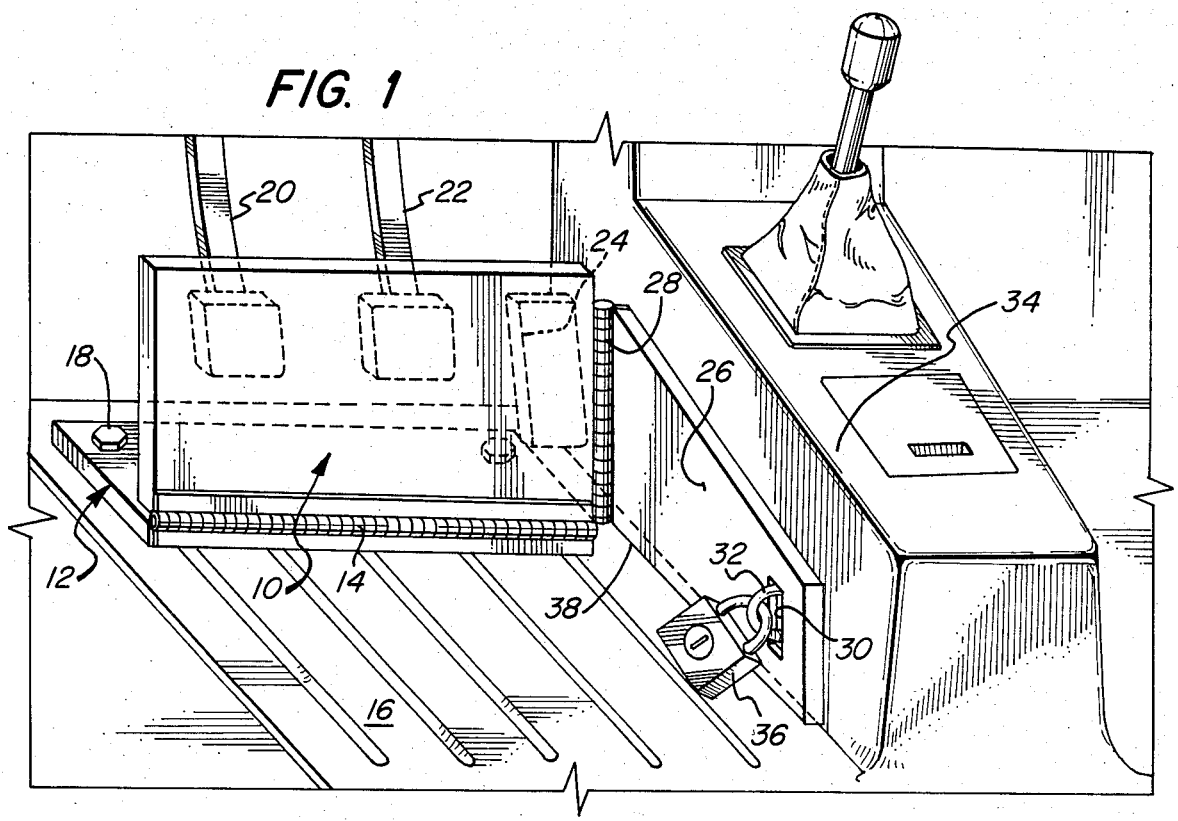
FIG. 1 is a partial perspective view of a device according to the invention installed in an automobile in the immobilizing position.

The invention will now be illustrated by reference to the accompanying drawings. Referring firstly to FIG. 1, which illustrates a device of the invention installed in the immobilizing position in an automobile, a first rigid plate 10 is attached to base plate 12 by hinge 14. Base plate 12 is secured to the floor 16 of the automobile, by bolts 18 or other appropriate means, at a location below clutch pedal 20 and brake pedal 22 and adjacent to accelerator pedal 24. Advantageously the hinge 14 is aligned in a direction which is parallel to the plane in which the face of pedals 20 and 22 are disposed. A second rigid plate 26 is attached to first rigid plate 10 by hinge 28. Slot or aperture 30 in second rigid plate 26 receives hoop 32 which is securely attached by bolts or like means (not shown) the lower edge of console 34. The hoop 32 projects through aperture 30 and has padlock 36 secured thereon, thereby anchoring the outer end of second rigid plate 26 to said console 34. It will be seen that, when so anchored, the second rigid plate 26 rigidly braces the first rigid plate 10 in contact with pedals 20 and 22. Preferably the height of the first rigid plate 10 is so chosen that the top edge of the plate in the position shown in FIG. 1 is above the top of pedals 20 and 22. The minimum height of said plate 10 is so chosen that the said pedals 20, 22 and 24 cannot be operated by the feet of a person sitting in the driver's seat of the automobile.

In the particular embodiment shown in FIG. 1 the plane of the first rigid plate 10 is disposed substantially vertically with respect to the floor of the automobile. As will be appreciated by one skilled in the art, the actual angle of disposition of the first rigid plate 10 is not critical so long as access to the pedals 20, 22 and 24 is effectively blocked. The angle at which the first rigid plate 10 is disposed can be varied, for example, by adjusting the location of the aperture 30 in second rigid plate 26, and or the location of the hoop 30 on console 34. Any such adjustments will obviously require an appropriate adjustment in the angle which the hinge 28 makes with the lower edge 38 of second rigid plate 26. The location of base plate 12 can also be varied in order to adjust the angle of disposition of first rigid plate 10.

In a particular embodiment of the device of the invention, the first rigid plate 10 is so located in the immobilizing position as to depress both pedals 20 and 22 so as to activate the brake mechanism of the automobile. However, it is not essential that plate 10 make physical contact with said pedals so long as the plate 10 prevents access to said pedals by a potential thief seeking to operate the automobile.

Figure 2:
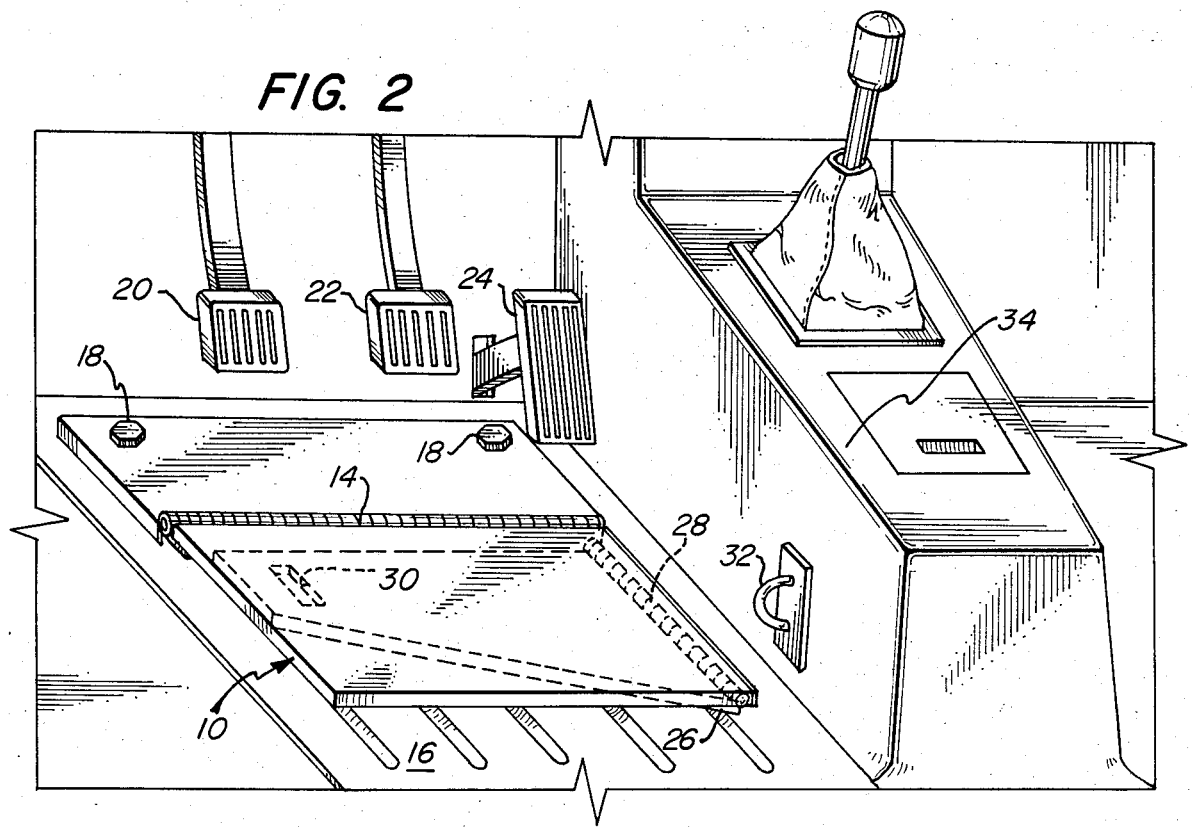
FIG. 2 is a partial perspective view of the device as shown in FIG. 1, but in the stored position.

FIG 2 shows the device illustrated in FIG. 1 in the stored position, the same numerals being employed in both FIGS. to designate the common elements. In the position shown in FIG. 2, the second rigid plate 26 has been disengaged from the hoop 32 and has been folded under the first rigid plate 10 and the latter has, in turn, been folded down on to the floor 16 of the automobile. Advantageously an appropriate recess (not shown) is provided in the floor of the automobile in order to receive the two rigid plates in the folded position. The only component of the device shown in FIG. 1 which is not stored in the manner illustrated in FIG. 2 is the padlock 36. This is a component of very small bulk which can readily be accommodated in the glove compartment or other convenient location in the automobile.

Figure 3:
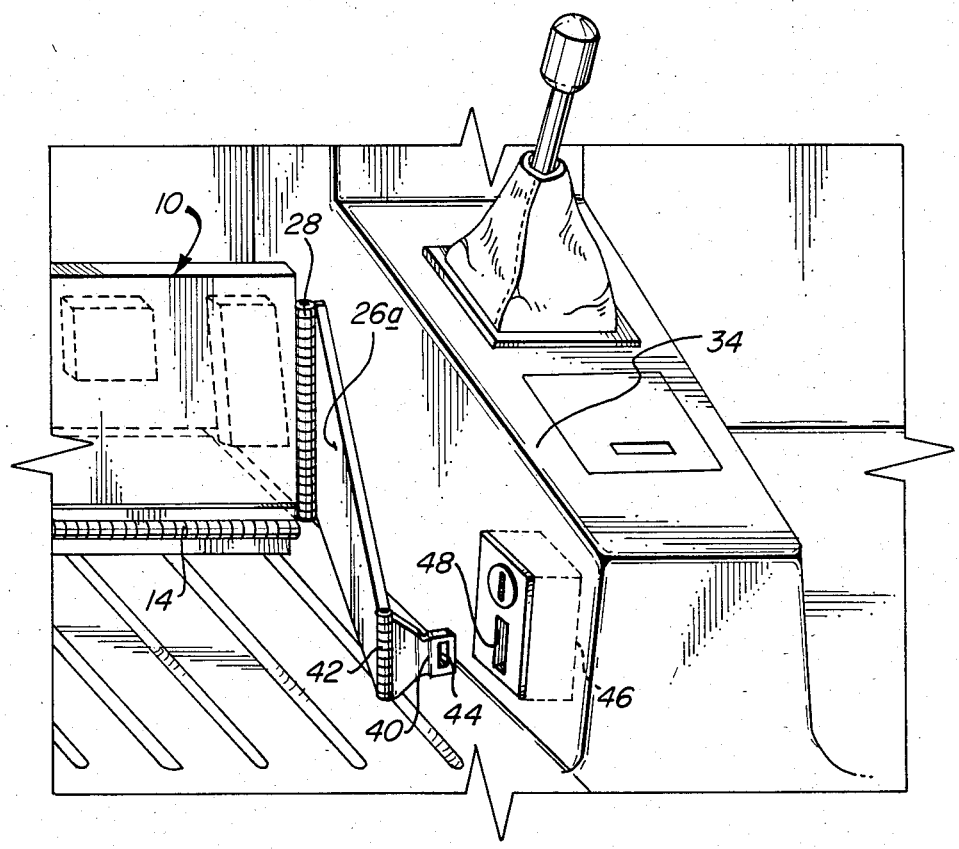
FIG. 3 is a partial perspective view of an alternative means of locking the device shown in FIG. 1.

FIG. 3 is a partial perspective view of a device of the invention showing an alternative manner in which the outer end of the second rigid plate can be secured to the console 36. In this embodiment the second rigid plate 26a is provided with a tongue 40 attached to the outer end of said rigid plate by hinge 42. The tongue 40 is provided with slot 44 which is adapted to be engaged by a bolt within lock 46 when tongue 40 is inserted into the aperture 48 of the said lock. Advantageously the lock 46 is recessed into the console 36 and is operated by the same key employed in the various door locks of the automobile. It will be seen that the embodiment of FIG. 3 is free from any component which has to be removed and stored when the device is not in the immobilizing position.

The device of the invention has been illustrated above by reference to the embodiments shown in the various drawings. It is to be understood that these embodiments have been shown by way of illustration only and are not intended to be limiting. Various modifications will be readily apparent to one skilled in the art which can be adopted without departing from the spirit of the invention. Illustratively, the second rigid plate shown in the various drawings can be hingably attached to the other end of the first rigid plate and, in the immobilizing position, can be secured to hoop means appropriately located at or near the automobile floor below the driver's door. In another alternative embodiment a third rigid plate can be hingably attached to the first rigid plate at the opposite end thereof from the second rigid plate. In this embodiment both the second and third rigid plates can be provided with locking means of any of the types described above to secure them in braced position with respect to the first rigid plate.

While the device of the invention has been illustrated above in operation in a standard shift automobile it will be readily apparent to one skilled in the art that the device can be employed to block access to or to immobilize the operating pedals in an automobile with automatic transmission.

What is claimed is:

1. An anti-theft locking device for immobilizing the foot pedal assembly normally necessary for operation of an automobile, said device comprising in combination:
   a first rigid plate hingably attached to the floor of the automobile adjacent the foot pedal assembly and adapted to be raised from a stored position abutting said floor to an upwardly inclined immobilizing position in contact with said foot pedal assembly;
   a second rigid plate hingably attached to said first rigid plate and adapted to be folded under said first rigid plate in the stored position of the latter and to be moved to a position in which to brace said first rigid plate securely in position when the latter is in the immobilizing position; and
   locking means adapted to secure said second rigid plate in the brace position when said device is activated to immobilize said foot pedal assembly.

2. A device according to claim 1 wherein said first rigid plate is hingably attached to a base plate secured to the floor of said automobile.

3. A device according to claim 1 wherein said first rigid plate is rectangular and hingably attached along one of its longer sides to the floor of said automobile in a direction substantially parallel to the plane in which said foot pedals are disposed.

4. A device according to claim 1 wherein said locking means comprises a padlock securing said second rigid plate to hoop means located on the floor of said automobile.

5. A device according to claim 1 wherein said second rigid plate is provided with slot means adapted to engage hoop means located on the floor of said automobile when said second rigid plate is in the brace position and said locking means comprises a padlock securing said plate on said hoop means.

6. A device according to claim 5 wherein said hoop means is securely affixed to the central console on the floor of said automobile.

7. An anti-theft locking device for immobilizing the foot pedal assembly normally necessary for operation of an automobile, said device comprising in combination:
   a base plate secured to the floor of the automobile adjacent said foot pedal assembly;
   a first rigid plate hingably attached to said base plate and adapted to be raised from a stored position abutting said floor to an upwardly inclined immobilizing position in contact with said foot pedal assembly;
   a second rigid plate hingably attached to said first rigid plate and adapted to be folded under said first rigid plate in the stored position of the latter and to be moved to a position in which to brace said first rigid plate securely in the immobilizing position of the latter;
   locking means adapted to hold said second rigid plate securely in the brace position when said first rigid plate is in the immobilizing position.

8. A device according to claim 7 wherein said second rigid plate is provided with an aperture adapted to receive hoop means disposed on the floor of said automobile and said locking means comprises a padlock installed on said hoop means projecting through said aperture.

9. A device according to claim 7 wherein the upper edge of said first rigid plate when in the immobilizing position projects above the pedals in said pedal assembly.

10. A device according to claim 7 wherein said first rigid plate is rectangular and is hingably attached by one of it longer sides to said base plate, said side being aligned in a direction substantially parallel to the plane in which said foot pedals are disposed.

11. A device according to claim 10 wherein said second rigid plate has a length approximating that of said first plate, the sides of said first and second rigid plates hingably attached to each other are substantially equal and the width of said second rigid plate decreases substantially uniformly from the hingably attached end to the opposite end of said plate.

* * * * *